United States Patent [19]
Rosenthal, Jr. et al.

[11] 3,829,722
[45] Aug. 13, 1974

[54] FAN MOUNTING ASSEMBLY

[75] Inventors: Francis Joseph Rosenthal, Jr., Fork; Dale Christian Grieb, Baltimore, both of Md.

[73] Assignee: Black and Decker Manufacturing Company, Towson, Md.

[22] Filed: Aug. 9, 1973

[21] Appl. No.: 387,134

[52] U.S. Cl. .................. 310/50, 310/62, 415/214, 415/503, 416/134, 416/244
[51] Int. Cl. ............................................ H02k 9/06
[58] Field of Search ........ 15/413; 310/47, 50, 60 R, 310/62, 63; 415/213 R, 214, 503; 416/134, 244

[56] References Cited
UNITED STATES PATENTS

| | | | |
|---|---|---|---|
| 2,100,020 | 11/1937 | Andrews | 310/63 X |
| 3,344,291 | 9/1967 | Pratt | 310/50 |
| 3,513,720 | 5/1970 | Allport | 416/134 UX |
| 3,676,014 | 7/1972 | Bevan et al. | 417/423 X |

Primary Examiner—A. D. Pellinen
Attorney, Agent, or Firm—Leonard Bloom; Joseph R. Stotnik; Edward D. Murphy

[57] ABSTRACT

A portable electric tool including a housing having a motor disposed therein and provided with a rotatable armature shaft. A plastic fan for moving cooling air through the housing is secured and located on the armature shaft in a novel fashion which securely and accurately locates the fan on the shaft and minimizes stresses developed in the fan.

6 Claims, 4 Drawing Figures

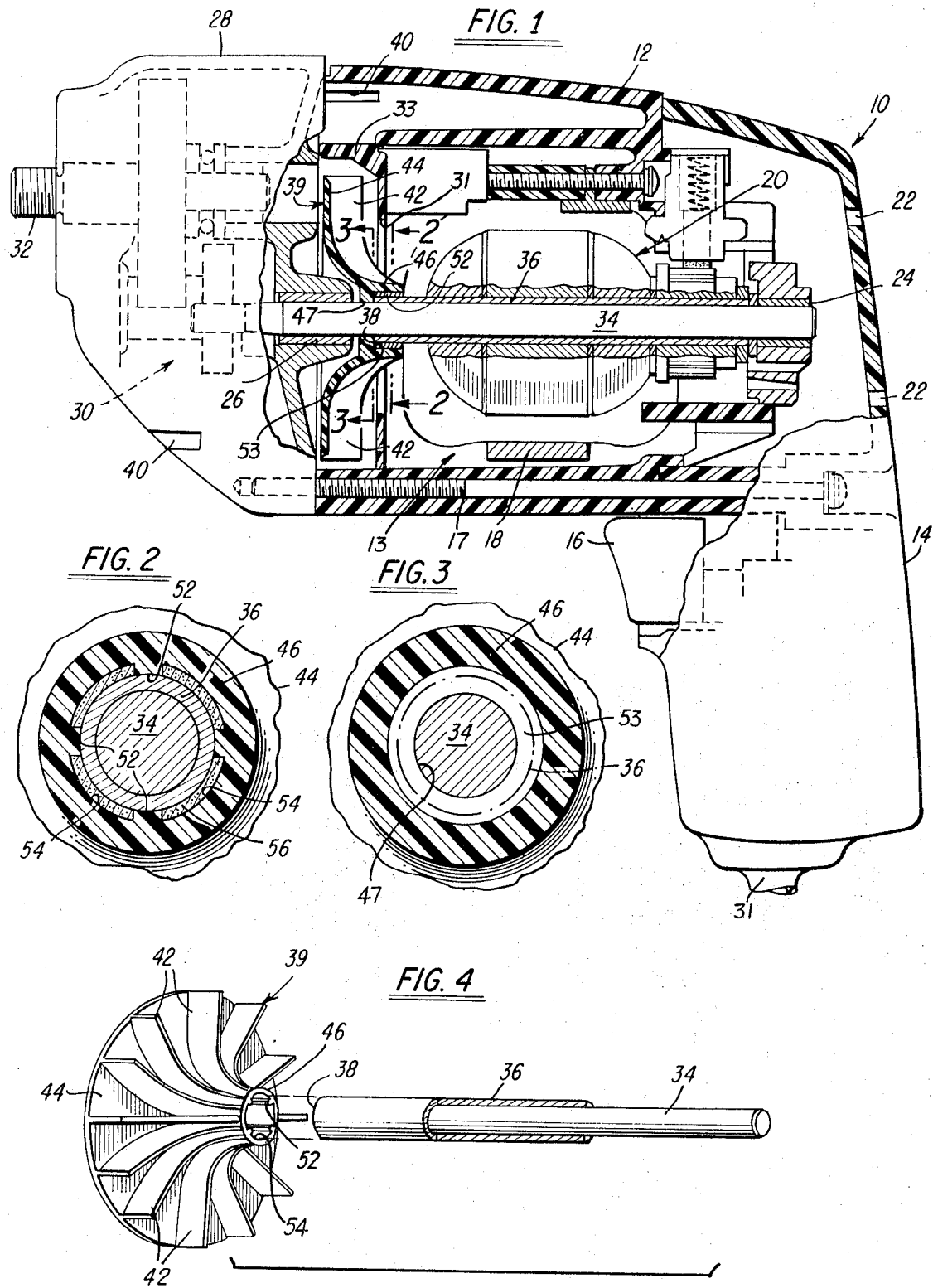

3,829,722

FAN MOUNTING ASSEMBLY

SUMMARY OF THE INVENTION

The present invention provides an improved construction for accurately locating and securely fastening a plastic fan to an electric motor, armature shaft. The fan is provided with a hub including an axial bore having a relatively short axial length surface area constructed to accurately fit the armature shaft and precisely locate the fan thereon. The fan hub has a counterbore constructed to slidably fit over an insulating sleeve secured to or molded on the armature shaft. An adhesive is disposed between the counterbore and sleeve and secures the fan and shaft for conjoint rotation. The relatively short axial length bore accurately locates the fan on the shaft but prevents build-up of internal stresses in the fan hub which might otherwise require reinforcement, such as a metal sleeve. The adhesive in the counterbore securely fastens the fan to the insulating sleeve on the armature shaft and obviates the need for special armature shaft modifications such as splines, knurled interfits, or the like. Importantly, the resultant assembly embodies the desired accuracy and reliability, and yet is relatively low in cost.

Main objects, therefore, of the present invention are to provide an improved fan mounting assembly for an electric motor wherein a plastic motor cooling fan is secured to a motor armature shaft in accurate and permanent fashion without the need for any fan reinforcement or special shaft construction.

Additional important objects of the present invention are to provide a fan mounting assembly of the above character which is relatively inexpensive to manufacture and assemble, and which results in a construction having inherent reliability and low cost.

Additional objects and advantages of the present invention will become more apparent from a consideration of the detailed description to follow taken in conjunction with the drawings annexed hereto.

BRIEF DESCRIPTION OF THE DRAWINGS

FIG. 1 is a view partly in section and partly in elevation showing a portable electric drill embodying the present invention;

FIG. 2 is an enlarged sectional view of FIG. 1 taken along the line 2—2 thereof;

FIG. 3 is an enlarged sectional view of FIG. 1 taken along the line 3—3 thereof; and FIG. 4 is an exploded perspective view showing a fan and armature shaft assembly embodying the present invention.

DETAILED DESCRIPTION

Referring now specifically to the drawings, a portable electric drill, which is one type of electric motor device in which the present invention finds particular use, is shown in FIG. 1 at 10 and is seen to include a housing made up of a field case 12, a gear case 28, and a rear housing and handle 14 suitably interconnected by axial screws 17. An electric motor 13 includes field laminations 18 secured within the field case 12, and an armature 20 including an armature shaft 34 supported fore and aft by bearings 26, 24, respectively. The forward end of the armature shaft 34 drivingly engages a gear train 30 located within the gear case 28, the latter terminating in an output spindle 32 to which a drill chuck (not shown) is suitably secured in the usual fashion.

The motor 13 is powered from a suitable A. C. source through a conventional line cord 31, and operation thereof is controlled in a normal fashion by a trigger switch 16 conveniently located at the front of the rear housing and handle 14.

It is customary to provide a fan for moving cooling air through and over the motor 13. To this end, a fan 39 is fixed to the armature shaft 34 and located adjacent the forward end of the field case 12. The fan 39 is a one-piece molded plastic assembly including an axial hub 46 and radial web 44, the latter being formed with a plurality of vanes or blades 42, and serves to draw cooling air axially of the field case 12, from right to left as seen in FIG. 1, by means of apertures 22 formed in the rear housing 14. This cooling air moves over and through the motor 13, through a restricted opening 31 in a fan baffle 33, and is discharged radially through apertures 40 in the field case 12.

Constructing the fan 39 from a molded plastic material is inherently a desirable feature in that this material is inexpensive, relatively light in weight and low in inertia. In addition, this plastic fan can serve as an assist in insulating the tool 10. However, certain inherent problems can arise in plastic fans of this type. Thus, fixing these fans and shafts by press fitting a long axial length of the fan on the armature shaft can result in high stresses at the fan hub 46 in the plastic fan material causing the fan hub and the joint between the fan and shaft to fail. Generally then a metal sleeve is provided in the fan hub for reinforcement and secure and accurate fit to the armature shaft. Furthermore, in order to insure secure attachment of the fan 39 and the armature shaft 34 generally requires a positive interconnection, such as splined or knurled surface on the armature shaft 34 which is deformably gripped by the plastic material inside the fan hub 46. Fan hub reinforcement adds to the weight and expense of the fan 39, while a splined or knurled armature shaft 34 requires an additional formation on that shaft and an attendant cost increase.

In accordance with the present invention, a molded plastic fan 39 is accurately and permanently secured to an unmodified armature shaft 34. As shown, the fan hub 46 is fitted over the armature shaft 34 and includes a relatively short length axial bore 47 snugly fitted (pressed) on the armature shaft 34. The hub 46 is also formed with a counterbore 52, separated from the bore 47 by a radial wall 53, and closely but slidably fitted over an insulating sleeve 36 fixed to the shaft 34. In assembly, the radial wall 53 on the fan hub 46 engages a forward radial end 38 of the insulating sleeve 36. In addition, the counterbore 52 is formed with recesses or enlarged areas, axially extending slots 54, adapted to receive a suitable adhesive 56, which may be a room temperature vulcanizing rubber, an epoxy resin, or a polyacrylate resin such as RC-40 or RC-75 manufactured by Loctite Corp.

As described above, the present inventive construction makes advantageous use of a plastic, and therefore insulating, low weight, low cost, and low inertia fan 39, and yet insures that this fan is accurately assembled to the armature shaft 34 without development of high stresses in the fan requiring a reinforcing insert, as has been the case in some prior art devices. This is achieved by means of the relatively short, axial length bore 47 pressed on the armature shaft 34, and which serves solely to locate the fan 39 on the shaft 34. On the other hand, the fan 39 is fixedly and permanently secured to the armature shaft 34 by means of the counterbore 52 slidably fitted on the sleeve 36, and the slots 54 which accommodate the adhesive material 56.

Furthermore, the insulating nature of the fan material helps to provide an insulating barrier for the motor parts. Thus, the fan 39 helps to insulate the armature windings from the armature shaft 34.

By the foregoing, there has been disclosed an improved fan mounting assembly for an electric motor calculated to fulfill the inventive objects hereinabove set forth. While a preferred embodiment has been illustrated and described in detail herein, various additions, substitutions, modifications and omissions may be made thereto without departing from the spirit of the invention.

What is claimed:

1. In an electrically operated motor including an armature shaft and a fan mounted thereon for moving air as the shaft is rotated, comprising in combination, an insulating sleeve telescoped on and secured to the shaft for rotation therewith, said fan comprising a hub having a relatively short length axial bore press fitted to said shaft, and a counterbore fitted over said sleeve, a plurality of circumferentially spaced, axially extending recesses in said counterbore, and adhesive means in said recesses and securing said fan to said shaft.

2. In an electrically operated power tool including a housing, field coil, and an armature including a shaft mounted on spaced bearings in the housing, said housing including apertures at opposite ends of said shaft for entry and egress of cooling air, the armature shaft including a tubular insulating sleeve secured thereto and interposed between said armature and shaft; the improvement in which said sleeve includes a terminal shoulder, a fan including a stepped bore, a first portion of said bore being fitted to said shaft for locating said fan and a second portion of said bore engaging and secured to said sleeve, said first and second portions being disposed on opposite sides of said terminal shoulder of said sleeve.

3. A motor cooling fan and armature shaft assembly comprising a one-piece molded plastic fan including an axial hub and radially projecting blades, said hub including an axial bore press fitted to said shaft radially positioning said fan on said shaft, insulating means secured to said shaft, a counterbore adjacent said bore and slidably fitted over said insulating means, and adhesive material disposed in the space between said counterbore and said insulating means and securing said fan and said shaft for conjoint rotation.

4. In an electrically operated power tool including a housing, field coil, and an armature including a shaft mounted on spaced bearings in the housing, said housing including apertures at opposite ends of said shaft for entry and egress of cooling air, the armature shaft including a tubular insulating sleeve secured thereto and interposed between said armature and shaft; the improvement in which said sleeve includes a terminal shoulder, a one-piece molded plastic fan on said shaft, said fan including a stepped bore having a first portion press fitted on said shaft and a second portion secured by adhesive to the sleeve.

5. In an electrically operated power tool including a housing, field coil, and an armature including a shaft mounted on spaced bearings in the housing, said housing including apertures at opposite ends of said shaft for entry and egress of cooling air, the armature shaft including a tubular insulating sleeve secured thereto and interposed between said armature and shaft; the improvement in which said sleeve includes a terminal shoulder, a one-piece molded plastic fan on said shaft, said fan including a stepped bore having a separating shoulder, said fan bore having a first portion press fitted on said shaft, and a second portion secured by adhesive to the sleeve, said fan shoulder engaging said sleeve shoulder.

6. A motor cooling fan and armature shaft assembly comprising a one-piece molded plastic fan including an axial hub and radially projecting blades, said hub including an axial bore press fitted to said shaft radially positioning said fan on said shaft, insulating means secured to said shaft, a counterbore adjacent said bore and slidably fitted over said insulating means, a plurality of axially extending slots in said counterbore, and adhesive material disposed in said counterbore slots and securing said fan and said shaft for conjoint rotation.

* * * * *